United States Patent [19]

Roberts

[11] Patent Number: 5,014,167
[45] Date of Patent: May 7, 1991

[54] VISUAL SIGNALING APPARATUS

[75] Inventor: John K. Roberts, Sheboygan, Wis.

[73] Assignee: K. W. Muth Company, Inc., Sheboygan, Wis.

[21] Appl. No.: 482,254

[22] Filed: Feb. 20, 1990

[51] Int. Cl.⁵ .......................... F21V 7/22; B60Q 1/00
[52] U.S. Cl. .................................. 362/83.1; 362/135; 362/800; 362/248; 362/290; 362/341; 340/475; 340/479
[58] Field of Search ................. 362/61, 80, 83.1, 135, 362/140, 800, 227, 248, 249, 296, 290, 341, 343; 340/475, 479

[56] References Cited

U.S. PATENT DOCUMENTS

4,516,197  5/1985  Yonkers ........................ 362/240 X
4,588,267  5/1986  Pastori ........................ 362/83.1 X Primary Examiner—Ira S. Lazarus
Assistant Examiner—Peggy A. Neils
Attorney, Agent, or Firm—Godfrey & Kahn

[57] ABSTRACT

A visual signaling apparatus including an enclosure having an aperture, and defining a cavity, a light source for emitting light in predetermined wavelengths borne by the enclosure and positioned in the cavity; and a semi-transparent dichroic mirror borne by the enclosure and disposed in substantially occluding relation relative to the aperture, the semi-transparent dichroic mirror adapted to selectively reflect ambient light and transmit the predetermined wavelengths of light emitted by the light source.

14 Claims, 5 Drawing Sheets

VISUAL SIGNALING APPARATUS

BACKGROUND OF THE INVENTION

1. Field of the Invention

The present invention relates to a visual signaling apparatus which has a wide variety of uses but which has particular utility when mounted on, and electrically coupled with, the controls of an overland vehicle and the like; and more particularly to a combination rearview mirror and visual signaling apparatus which operates as a third brake lamp for overland vehicles such as passenger automobiles, light trucks and the like, or which alternatively may operate as an additional directional signaling lamp and rearview mirror assembly on tractor-trailer combinations and vehicles of similar design.

2. Description of the Prior Art

The beneficial effects of employing auxiliary, or so-called "third" brake lamps has been known for some time. More particularly, federal law mandates that new automobiles include an auxiliary or third brake lamp which is mounted substantially along the longitudinal axis of same and oriented rearwardly of the passenger compartment. In most instances, the third brake lamps are positioned inside the passenger compartment and displayed in the rear windscreen thereof. Occasionally, however, and due to design considerations, a third brake lamp may, alternatively, be mounted in a housing which is fixed to the trunk or the like. Such an arrangement is used in the case of convertibles, for example.

While these third brake lamps generally operate in the manner intended, that is, to provide a visual signal when the brakes are applied, the means by which these third brake lamps have been mounted on overland vehicles, and more particularly passenger automobiles wherein the third brake lamps are mounted in the rear windscreen thereof, have generally been considered to detract from the stylish appearance of the most recently manufactured automobiles. Further, and when the third brake lamp is mounted in a position exterior to the passenger compartment, such third brake lamps and its associated exterior housing detracts from the surrounding design features of the automobile and which normally include smooth substantially continuous lines which tend to give the vehicle an overall aerodynamic appearance. Further, the housing of these assemblies provides an obstruction to the rearward view of the operator, and therefore presents a safety hazard.

In addition to the foregoing, a convenient means for mounting a third brake lamp on light trucks has not been developed. Moreover, and in overland vehicles such as tractor-trailer combinations, a third brake lamp has not been employed with same. However operators of such vehicles have long recognized a need for additional brake lamps which could signal an operator of an adjoining vehicle, which may be following closely or passing, that the tractor-trailer is braking, or otherwise preparing to change lanes. This would be particularly helpful when the adjoining vehicle passing the tractor-trailer is positioned between the rear of the trailer and the towing tractor, respectively, and in an area which could be out of the view of the tractor-trailer operator as he employs his exterior side view mirrors to look rearwardly.

The manufacturers of overland vehicles have approached the problems related to the less than attractive appearance of third brake lamp assemblies by designing brake lamps having lower relative profiles and by making other automobile body design changes wherein the third brake lamp is not as visibly apparent when one views the automobile. However, such design modifications have not been completely satisfactory and with respect to the earlier identified problems related to light trucks, and tractor-trailer combinations, it should be understood that, with respect to light trucks, loads placed in the beds thereof could conceivably obscure such third brake assemblies if they were mounted in a fashion similar to that used for passenger vehicles. Further, and with respect to tractor-trailer combinations, additional directional signaling lamps have recently been mounted on newly designed trailers, the respective directional signaling lamps mounted substantially intermediate the trailer portion, and which operate to provide additional visual signals in the event the tractor-trailer chooses to change lanes.

Therefore, it has long been known that it would be desirable to have an improved visual signaling apparatus for an overland vehicle and which is adapted to be mounted on the vehicle and which does not detract from the stylish appearance thereof, and which further does not inhibit the rearward view of the operator, the apparatus mounted within the line of sight of an operator, and providing a visual signal similar to that provided heretofore by a third brake lamp, and which further may be rendered operable to provide directional signaling information to vehicles following adjacent thereto, and which further acts as a rearview mirror for the same vehicle, the apparatus being readily removable for maintenance or modification after installation, and being both inexpensive to manufacture and sell and characterized by a compact, aesthetically pleasing, appearance.

SUMMARY OF THE INVENTION

Therefore it is an object of the present invention to provide a improved visual signaling apparatus.

Another object of the present invention is to provide such an apparatus which may be manufactured and installed as original equipment on overland vehicles or the like, or which may further be manufactured in the manner of a retrofit.

Another object of the present invention is to provide such an apparatus which is readily adaptable to most all models and designs of commercially available overland vehicles.

Another object of the present invention is to provide an apparatus which operates as a combination rearview mirror and brake lamp or directional signaling lamp.

Another object of the present invention is to provide a visual signaling apparatus which operates to provide a visual signal which is selectively obstructed or blocked by a baffling assembly and wherein the baffling assembly permits the visual signal to be seen only from a position along a transmission path which is outside of the line of sight of an operator.

Another object of the present invention is to provide such a visual signaling apparatus which includes a dichroic mirror which is operable to reflect natural and artificial ambient light and which further is adapted to selectively transmit predetermined wavelengths of light from an artificial light source.

Another object of the present invention is to provide such a visual signaling apparatus which is of comparatively nominal cost to purchase and maintain, and which further does not aesthetically detract from the stylish appearance of the most recently manufactured vehicles and further does not inhibit or obstruct the rearward view of an operator utilizing same.

Another object of the present invention is to provide such an apparatus which is operable to obtain the individual benefits to be derived from related prior art devices while avoiding the detriments individually associated therewith.

Further objects and advantages are to provide improved elements and arrangements thereof in a visual signaling apparatus for the purposes intended, which is dependable, economical, durable and fully effective in accomplishing these intended purposes.

These and other objects and advantages are achieved in a visual signaling apparatus, and wherein, in the preferred embodiment, the visual signaling apparatus includes an enclosure having an aperture, a semi-transparent mirror borne by the enclosure and substantially occluding the aperture and adapted selectively to transmit and reflect light in predetermined wavelengths, and means borne by the enclosure for emitting artificial light in the wavelengths transmitted by the semi-transparent mirror, and wherein the mirror is both an excellent reflector of ambient light and an excellent transmitter of the predetermined wavelengths of artificial light emitted by the lighting means.

DESCRIPTION OF THE PREFERRED EMBODIMENT

Figure 1:
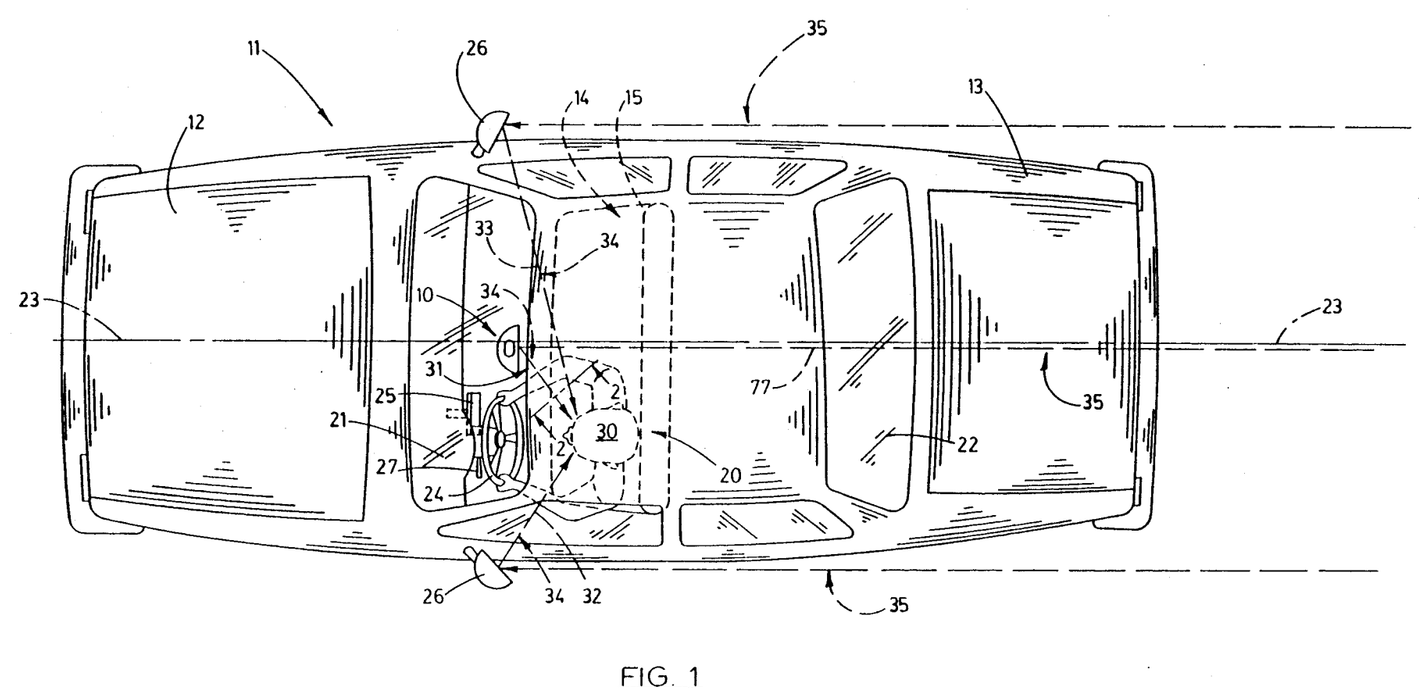
FIG. 1 is a plan view of the apparatus of the subject invention shown in an operative environment of an overland vehicle and wherein some underlying surfaces are illustrated in phantom lines for illustrative convenience.

Referring more particularly to the drawings the visual signaling apparatus of the present invention is generally indicated by the numeral 10 in FIG. 1.

For illustrative convenience the apparatus shown and described herein is discussed as it would be configured if it were installed on an overland vehicle 11 of conventional design and wherein the apparatus may be mounted on the vehicle, alternatively in place of the rearview mirror which is located in the passenger compartment, and/or in place of the side view mirrors which are mounted on the exterior surface of the vehicle. The apparatus 10 of the subject invention will be discussed in greater detail in the paragraphs which follow. The apparatus 10 is adapted to operate as a combination rearview mirror and visual signaling apparatus and wherein the visual signal it provides is capable of being seen from a position rearwardly of the overland vehicle 11 but which further cannot be seen by an operator of the same vehicle.

As best illustrated by reference to FIG. 1 the visual signaling apparatus 10 of the subject invention is mounted on an overland vehicle 11 of conventional design having a front end or forward portion 12 and a rear end or portion 13. The overland vehicle 11 has a passenger compartment 14 which includes a front seat 15 and which further defines an operator's position 20. The overland vehicle 11 also includes front and rear windscreens 21 and 22, respectively, and further has a longitudinal line or reference 23, a steering wheel 24 and a brake pedal 25. A pair of side view mirrors 26 are mounted on opposite sides of the overland vehicle and in a position exterior to the passenger compartment 14. The overland vehicle 11 further has a hand operated directional signaling switch 27 which is coupled with a directional signaling assembly [not shown], and which provides a visual signal which may alert drivers of other vehicles in the immediate vicinity that the overland vehicle 11 is about to change directions, turn, change lanes, etc.

Figure 1A:
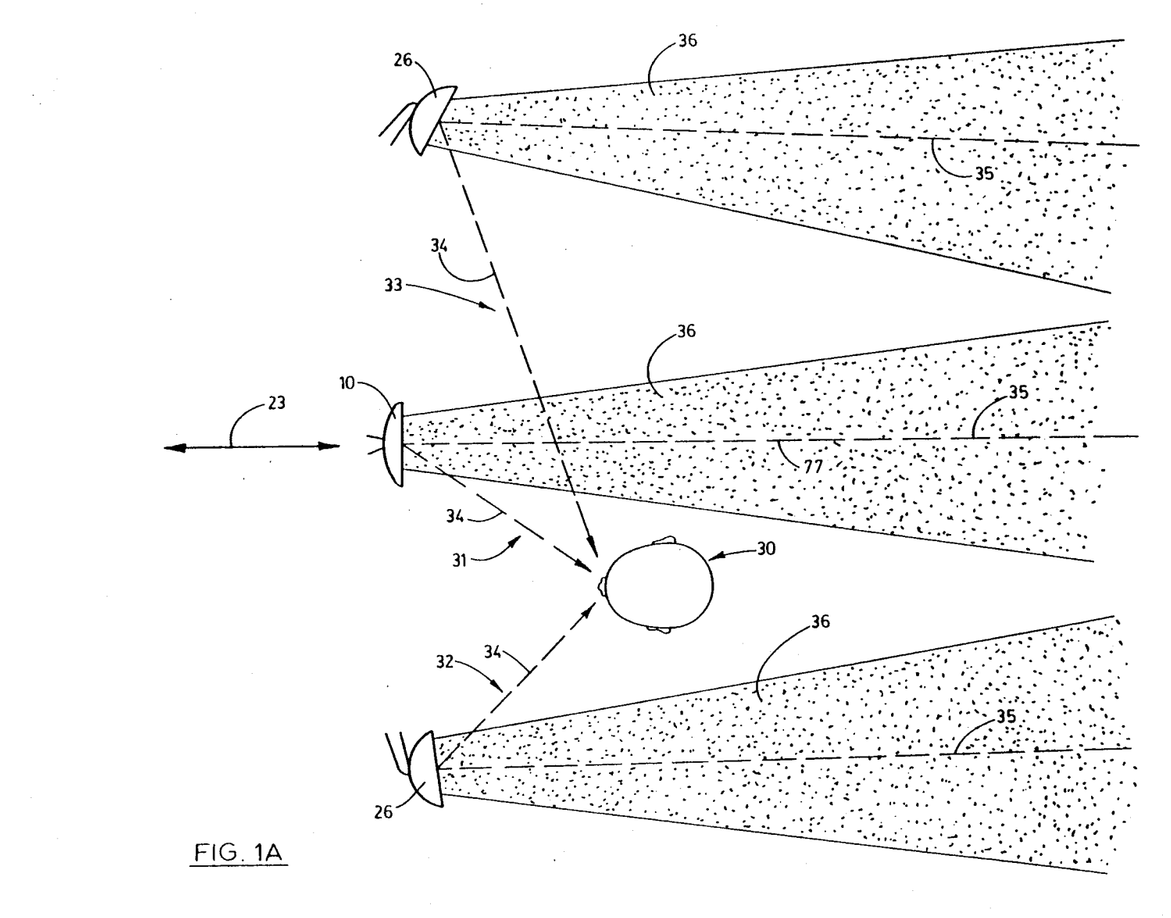
FIG. 1A is a schematic plan view of the apparatus of the subject invention shown in an operative environment, and wherein the surrounding supporting surfaces are removed for illustrative convenience.

As best illustrated by a comparison of FIGS. 1 and 1A an operator 30 when positioned in the operator's position 20 has a field of view which extends approximately 180° from the operators position toward the forward portion 12 of the vehicle. Further and by using the pair of side view mirrors 26, and the apparatus 10 the operator may, by looking along predetermined lines of sight, view areas beyond his normal field of view, and rearwardly of the operators position 20. In particular, and as best illustrated by reference to FIG. 1A, the operator 30 has a first line of sight 31, which extends from the operator 30, to the apparatus 10 and which permits the operator to view rearwardly of the vehicle 11 and substantially along the longitudinal line of reference 23. The operator 30 further has a second line of sight 32 which extends from the operator to the left or operator,s side view mirror 26 of the vehicle 11 and rearwardly thereof and which permits the operator 30 to view rearwardly of the overland vehicle along a line of sight which is substantially parallel to the longitudinal line of reference 23. Furthermore, the operator has a third line of sight 33 which extends from the operators position 20 to the passengers side view mirror 26 and rearwardly thereof. It similarly permits the operator to view along a line of sight which is substantially parallel to the longitudinal line of reference 23. Each of the respective lines of sight 31, 32 and 33 have a first component 34 which extends from the operator to the respective mirror; and a second component 35 which extends rearwardly of the vehicle. Further the individual mirrors 26 and the apparatus 10 each have respective illumination zones 36 which will be discussed in greater detail hereinafter. These relationships are best seen by reference to FIG. 1.

Figure 2:
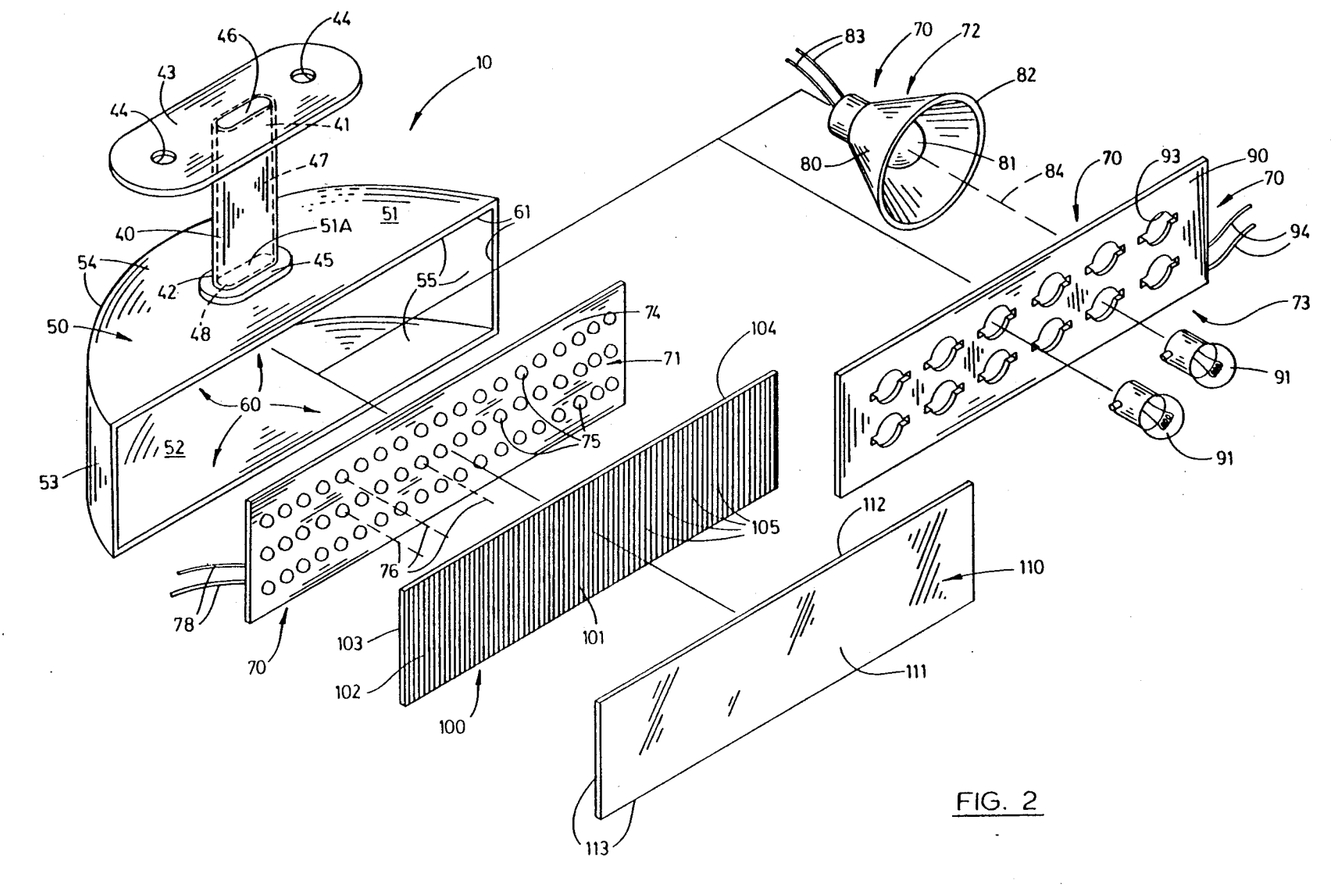
FIG. 2 is a perspective, exploded, side elevation view of the apparatus of the subject invention taken from a position along line 2—2 of FIG. 1.

The apparatus 10, and which is best illustrated by reference to FIG. 2, includes a support member 40 having first and second ends 41 and 42 respectively, and wherein the first end 41 is fixed to a mounting bracket 43 which includes a pair of apertures 44, The apertures 44 are adapted to receive suitable fasteners such as screws or the like. In addition, the second end 42 is fixed to a swivel connector 45 in a manner which is well understood in the art. The mounting bracket has a substantially centrally disposed aperture 46 which is mounted in registry with a passageway 47 which is formed substantially centrally of the support member 40. An aperture 48 is formed in the swivel connector 46 and disposed in registry with the passageway 47. The swivel connector 45 is fixed to a housing or enclosure 50 and thereby permits the enclosure to be rotated into various positions relative to the operator's position 20 thereby positioning an accompanying mirror in selected positions to provide a field of view rearwardly of the overland vehicle 11 appropriate for the operator 30. The mirror will be discussed in greater detail hereinafter. The housing or enclosure 50 has a top wall 51 which has formed therein an aperture 51A which is disposed in substantial registry with the aperture 48, a bottom wall 52, and a side wall 53 which joins the top and bottom walls together. As shown in FIG. 2, the sidewall 53 is narrowly rectangular and arcuately shaped, however it should be understood that other enclosure shapes will work with equal success and the final enclosure shape will be largely determined on aesthetic considerations. The individual wall members 51, 52 and 53 respectively have exterior or outside surfaces 54 and opposite inside surfaces 55 which define a cavity 60 of predetermined dimensions. Further the individual walls, in combination, define an aperture 61 which permits access to the cavity 60.

As best illustrated by reference to FIG. 2 a lighting means and which is herein illustrated as a light source which is generally indicated by the numeral 70, is borne by the housing or enclosure 50 and mounted in the cavity 60 for purposes of emitting artificial light of predetermined wavelengths. In the preferred embodiment, three alternative light sources are shown and which may be used with equal success. However, the invention is not limited to the three light sources discussed herein but may include other artificial light sources which have the characteristics which will be discussed in greater detail hereinafter. It should be understood that notwithstanding the light source 70 selected, the light source must be operable to produce wavelengths of light which are substantially "matched", that is, having wavelengths which are substantially identical to the peak wavelength transmittance characteristics of an associated dichroic mirror and which is mounted on the enclosure 50 and disposed in substantially occluding relation relative to the aperture 61. The characteristics of the dichroic mirror will be discussed in greater detail hereinafter. In the present form of the invention, however, the individual light sources are operable to produce artificial light having wavelengths which include the 600 through 700 nanometer band and which manifests itself by producing the color red. The invention is not limited to the peak wavelengths recited herein and may further be used with any number of wavelength combinations such that any visual spectrum colors can be seen. The individual light sources include first, second and third forms, 71, 72, and 73, respectively.

The first form 71 of the light source 70 includes a bank of LEDs [light emitting diodes]; the second form 72 of the light source 70 includes a single lamp having a light bulb and suitable reflector; and the third form 73 includes a lamp support plate which is adapted to receive a plurality of automotive light bulbs 91. The particulars of the individual forms will now be discussed in greater detail. The first form 71 of the light source 70 includes a bank of LEDs which are individually mounted on a support plate 74 and which are adapted to produce artificial light having wavelengths which include the 600 through 700 nanometer band. A commercially available LED which fits these performance characteristics is manufactured by Mitsubishi Cable Industries Ltd. of Tokyo, Japan under the trade designation "MLY2-RN05 through MLY2-RN20". These particular LEDs have high efficiency, and are ultra-radiant red LEDs which have a narrow viewing angle and a peak wavelength which falls within the 600 through 700 nanometer band. Each of the respective LEDs have a beam center 76 which is individually oriented in substantially the same direction and which, in the form of the invention shown in FIG. 2, would normally be oriented in a direction wherein the artificial light produced from the individual LEDs would travel along a transmission path 77 which is disposed in substantially parallel relation relative to the longitudinal line of reference 23 and rearwardly of the overland vehicle 11 such that it could be seen by another vehicle traveling in close proximity thereto and within the illumination zone 36. Suitable electrical leads 78 would connect the bank of LEDs with the braking or signaling assembly of the vehicle not shown. The electrical leads would extend through the passageway 47 of the support member 40 to the appropriate signaling assembly.

The second form 72 of the light source 70 is best seen by reference to FIG. 2 and may be used in place of the first form of the light source 71 and which was described earlier as a bank of LEDs. With respect to the second form of the light source 72, the second form includes a single bulb or lamp 81 which is mounted in or made integral with a suitable reflector 82. The lamp would be connected by suitable electrical leads 83 to the signaling assemblies of the vehicle such as, for example the braking system and wherein upon applying pressure to the brake pedal 25 the lamp would become energized. An appropriate commercial lamp for this purpose is the GE Precise lamp and which is designated commercially as the MR-16. The lamp 80 has a beam center 84 which is similar in function to the beam centers described with respect to the first form of the light 71.

As best illustrated by reference to FIG. 2 the third form 73 of the light source 70 includes a synthetic lamp support plate 90 which is adapted to support a plurality of replaceable automotive bulbs or lamps 91 such as the model No. 882 automotive bulbs which are commercially available, nationwide. As best seen by reference to the drawings, the lamp support plate has a plurality of apertures 93 which permits the individual replaceable lamps to be electrically coupled to the lamp support plate. The lamp support plate, of course, carries suitable etching on the reverse surface [not shown] and which conducts electric current from appropriate electric leads 94 to the individual lamps. These lamps 91 similarly produce artificial light having wavelengths which include the wavelengths of 600 through 700 nanometers.

Figure 4:
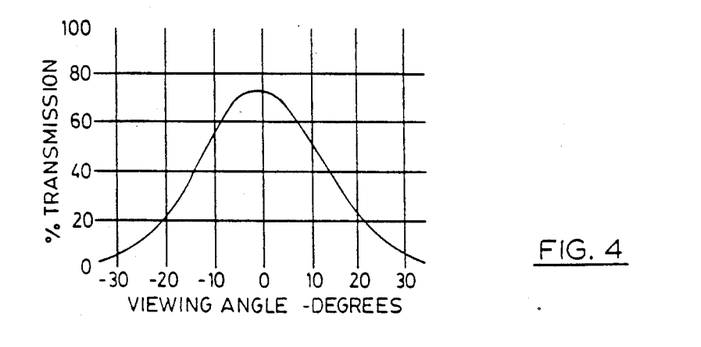
FIG. 4 is a graphic illustration of the viewing angle, in degrees, as it relates to the percentage of transmission of the light control film shown in FIG. 3.

A baffle assembly and, which is generally indicated by the numeral 100, includes a polycarbonate light control film which permits artificial light generated by the light source 70 to escape from the enclosure 50; the light emitted by the light source 70 traveling along the transmission path 77 and rearwardly of the overland vehicle 11 as best illustrated by reference to FIG. 1. The light control film 101 which is manufactured by the 3M Company under the trade designation LCF-P (light control film-polycarbonate) is a thin plastic film enclosing a plurality of closely spaced, black colored microlouvers. The light control film is approximately 0.030 inches [0.75 millimeters] thick, and the microlouvers are spaced approximately 0.005 inches apart (0.127 millimeters). The microlouvers, which will be discussed in greater detail hereinafter, may be a transparent black or an opaque black, and further, the microlouvers may be positioned in various angles to provide a viewing angle, which may include angles as narrow as 48° ±6° or as wide as 90°±15°. This is shown most clearl reference to FIG. 4. It should be understood that the baffle permits light emitted to escape within the viewing angle from the enclosure and travel rearwardly of the vehicle 11 along the transmission path 77 and within the illumination zones, but further is operable to inhibit or block the light emitted by the light source 70 from traveling outside the viewing angle and along the first component 34 of the first line of sight 31 and into the view of the operator 30. This is best seen by reference to FIGS. 1, 1A and 2. It should be apparent, therefor, that the operator may continue to use the apparatus 10 as a rearview mirror notwithstanding that artificial light is being emitted from same and is capable of being seen from a location rearwardly of the apparatus 10.

Figure 3:
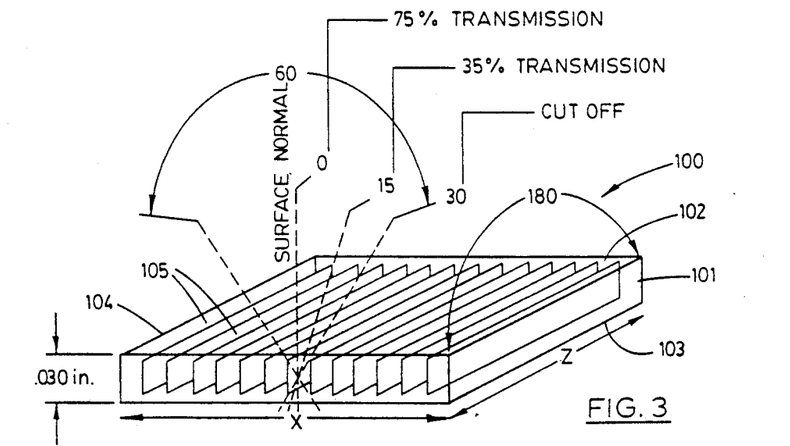
FIG. 3 is an enlarged, side elevation view of the light control film utilized in connection with the apparatus of the subject invention.

The light control film 101 has a forward facing or front surface 102 and a back or rearward facing surface 103. Further, the light control film is defined by a peripheral edge 104, the light control film being adapted to closely fit the interior dimensions of the cavity as defined by the inside surface 55 of the walls 51, 52, and 53 respectively.

As best seen by reference to FIG. 2, the apparatus 10 includes a semi-transparent mirror 110. In the preferred embodiment the semi-transparent mirror is a dichroic mirror which is adapted selectively to transmit and reflect light having predetermined wavelengths. As earlierly discussed, the light source 70 is operable to produce artificial light having wavelengths of 600 through 700 nanometers and which corresponds with the visible spectrum color red. In the preferred embodiment, the dichroic mirror 110 is operable to transmit the selected wavelengths of 600 through 700 nanometers thereby achieving several laudable benefits which will be discussed in greater detail hereinafter. Of course, and should a different visible color be desired, then, in that event, a different dichroic mirror would be selected which would transmit the wavelengths corresponding with the color selected. As should be understood the dichroic mirror is operable to transmit wavelengths which fall within a narrow band which is not greater than 150 nanometers in which. The dichroic mirror 110 has a front or forward facing surface 111, a back or rearwardly facing surface 112, and a peripheral edge 113 which closely fits the cavity 60 of the enclosure 50 thereby substantially occluding the aperture 61. This construction essentially inhibits any light leakage from the light source 70 which is mounted internally of the enclosure. Suitable dichroic mirrors may be procured from Optical Coating Labs of California which is located in Santa Rosa, CA.

Figure 5:
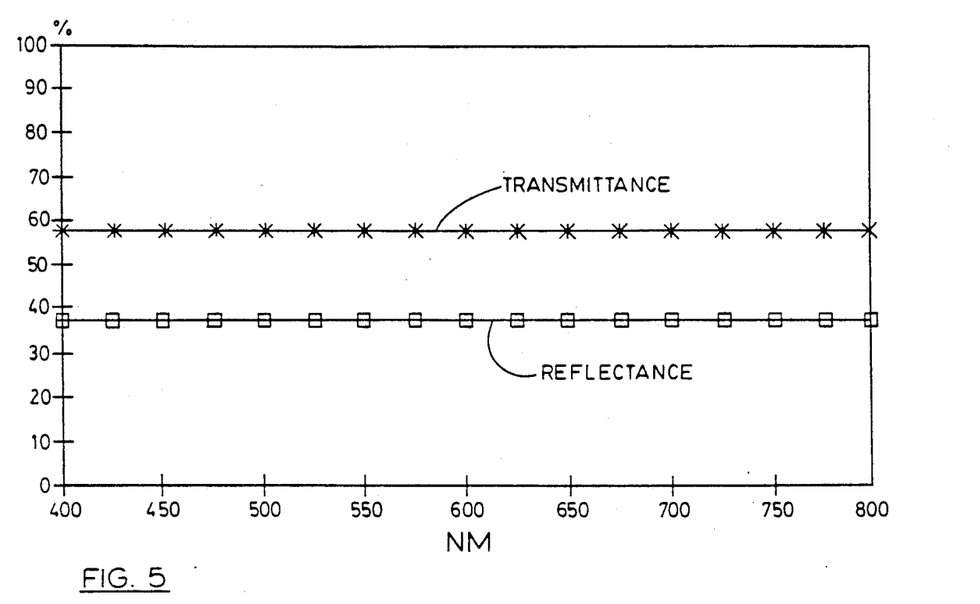
FIG. 5 is a graphic illustration of the reflectance and transmittance of a neutral, semi-transparent mirror, such as a half-silvered mirror, and wherein the neutral, semi-transparent mirror has an average transmittance of approximately 58% and an average visible spectrum reflectance of 37%.
Figure 6:
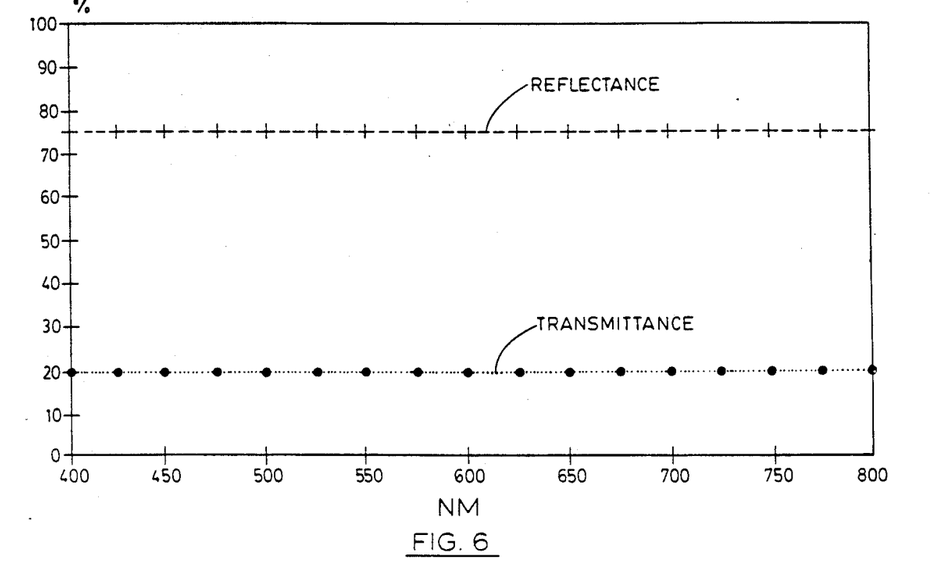
FIG. 6 is a graphic illustration of the reflectance and transmittance of a neutral, semi-transparent mirror such as a half-silvered mirror, and wherein the average visible spectrum reflectance is approximately 75% and the average transmittance of light having wavelengths in the 600 through 700 nanometer band is approximately 20%.
Figure 7:
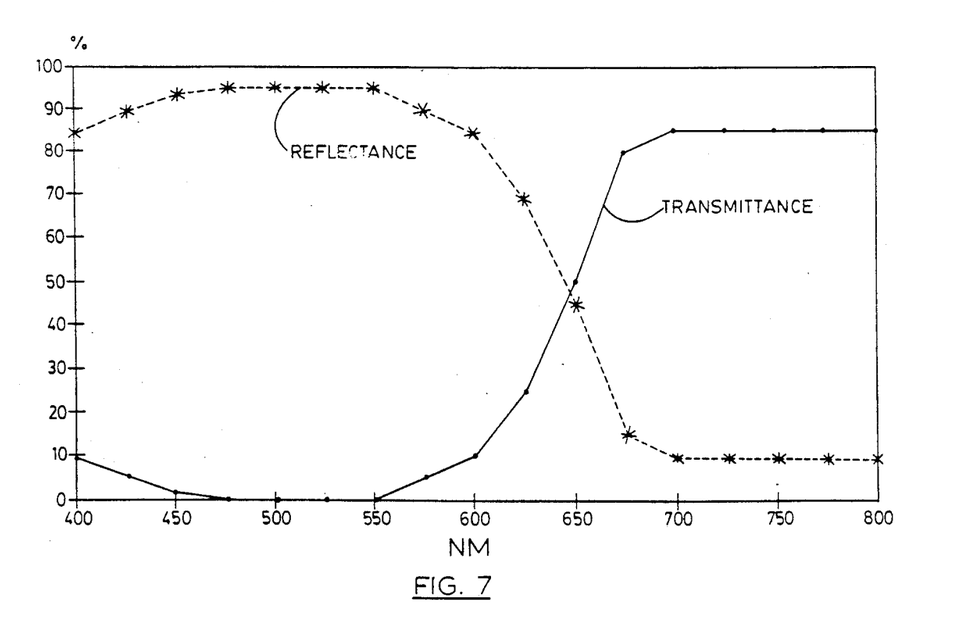
FIG. 7 is a graphic illustration of the reflectance and transmittance of the apparatus of the subject invention and wherein the apparatus includes a dichroic mirror which has an average visible spectrum reflectance of 75%, an average transmittance for light having wavelengths in the 600 through 700 nanometer band of approximately 58%, and greater than 90% transmittance for wavelengths greater than 700 nanometers.

To best understand the advantages achieved by employing a dichroic mirror 110 the inventor has provided in FIGS. 5, 6, and 7 graphic illustrations which demonstrate that a neutral, semi-transparent half-silvered mirror will not operate effectively for purposes of the present invention in view of optical characteristics inherent in its composition and structure. More particularly, FIGS. 5 and 6 show the relationship of transmittance and reflectance as it relates to neutral half-silvered mirrors. In general, as the transmittance increases reflectance decreases, and vice versa. This relationship is shown by a comparative study of FIGS. 5 and 6. Referring more particularly to FIG. 5, this figure illustrates the characteristics of a neutral semitransparent mirror which is capable of transmitting 58%, average, 600 through 700 nanometer wavelengths but is only capable of reflecting 37%, average, visible spectrum wavelengths. Similarly, and referring more particularly to FIG. 6, when a neutral transparent mirror, such as a half-silvered mirror is rendered operable to reflect 75% of the visible spectrum, the same mirror transmits only 20%, average, visible spectrum wavelengths. The relationship is clear, that is, as reflectance increases the corresponding ability of a neutral half-silvered mirror to transmit decreases, therefor in order to be a good reflector, the mirror, of necessity, must be a poor transmitter. If the mirror is a poor transmitter, then, in that event, a more powerful lamp must be utilized in order to have the same effect with respect to signaling. Utilizing a more powerful lamp, of course, creates problems in terms of the production and accumulation of heat in the enclosure 50 and the related problem of the dissipation of same.

In light of the above identified problems the present invention addresses same by providing a dichroic mirror 110 which is substantially "matched" with the light source 70 and more particularly to the selected wavelengths of light produced by the light source, that is, the dichroic mirror is operable to transmit a large percentage of the selected wavelengths of artificial light while simultaneously retaining the ability to be an excellent reflector of ambient artificial and natural light. By utilizing such a "matched" dichroic mirror, and as best understood by reference to FIG. 7, the dichroic mirror remains an excellent reflector, that is, achieving an average visible spectrum reflectance of 75%, while simultaneously achieving an average transmittance in the 600 through 700 nanometer band of 58%. Thus the apparatus of the subject invention, by utilizing a dichroic mirror substantially "matched" to the wavelengths of artificial light transmitted, becomes both an excellent reflector of ambient, visible spectrum light, as well as an excellent transmitter of artificial light emitted by light source 70. Further, and by utilizing a dichroic mirror 110 which is substantially "matched" to the wavelengths of light selected, the lower intensity light source 70 may be utilized thereby alleviating the problem related to the generation of heat within the enclosure 50. The inventor has further discovered that the dichroic mirror also operates to transmit the longer wavelengths of artificial light which generate heat energy thereby further inhibiting the generation and accumulation of heat within the enclosure 50.

OPERATION

The operation of the described embodiment of the present invention is believed to be readily apparent and is briefly summarized at this point.

As best illustrated by reference to FIG. 2 the apparatus 10 of the present invention includes an enclosure 50 having a cavity 60 and defining an aperture 61 and wherein the enclosure is mounted on the overland vehicle 11 in a location within a line of sight 31, 32, and/or 33 of an operator 30 who is positioned in the operator,s position 20. The apparatus 10 of the subject invention further includes a light source 70 mounted in the enclosure, and which is positioned in the cavity 60, the light source electrically coupled with a signaling assembly (not shown) and which in turn is coupled with a directional signaling switch 27, or a switch (not shown) which is used in combination with the brake pedal 25. As should be understood, and upon activation of the signaling assembly, the light source 70 is energized thereby producing light having wavelengths which include the 600 through 700 nanometer band. The semi-transparent dichroic mirror 110 is mounted on the enclosure 50 and is disposed in substantially occluding relation relative to the aperture 60 and which is adapted substantially to reflect 75% [average]visible spectrum wavelengths and further is operable to transmit substantially 58% [average]wavelengths having 600 to 700 nanometers.

A light control film 101 having a plurality of microlouvers 105 is positioned between the dichroic mirror 110 and the light source 70 or may be made integral with the dichroic mirrors and is adapted to direct or otherwise permit the escape of light emitted by the light source 70 from the enclosure 50 and along the transmission path 77 which is disposed in a position which is substantially parallel to the longitudinal line of reference 23 and rearwardly of the overland vehicle 11 such that it may be seen by the operators of adjacent overland vehicles travelling in close proximity thereto and within the illumination zone 36. Further the microlouvers are operable to substantially inhibit or block light emitted by the light source 70 from travelling along the first component 34 of the first line of sight 31 and into the operator's vision thereby distracting him.

As earlier discussed the apparatus 10 of the subject invention has been herein described as utilizing a light source which produces light having wavelengths which include the 600 to 700 nanometer band. However it should be apparent that the subject apparatus can be rendered operable to produce other colors of light based upon the particular application. For example, colors such as yellow, green, and blue may be selected for use with automobiles as well as other industrial applications. When alternative colors are selected, a light source 70 would be chosen such as an LED display, which would produce the wavelengths of light desired, usually within a 100 nanometer band, and a dichroic mirror 110 would be selected which would substantially transmit these same wavelengths.

Therefore the visual signaling apparatus 10 of the present invention can be employed in a wide variety of operative environments, can be manufactured and purchased at nominal cost, is effective in operation, and is compact thereby facilitating installation and maintenance, and which further reduces to an absolute minimum the problems associated with related prior art assemblies.

Having described my invention what I claim is new and desire to secure by letters patent is:

1. A visual signalling apparatus for use by an operator of an overland vehicle which has an operator's position, longitudinal line of reference, and a brake pedal, and wherein an operator when located in the operator's position has a line of sight, and the apparatus is positioned on the overland vehicle and within the line of sight of the operator, the visual signalling apparatus comprising:

an enclosure defining a chamber and having an aperture;

means borne by the enclosure for emitting light, and wherein the lighting means includes at least one lamp, and wherein the lamp emits light in the visible spectrum and in longer wavelengths constituting radiant heat energy;

a semi-transparent, dichroic mirror borne by the enclosure and substantially occluding the aperture, the dichroic mirror adapted substantially to reflect at least an average of 75% of the entire visible light spectrum and substantially transmit at least an average of 58% of the light having wavelengths of 600-700 nanometers, and wherein the dichroic mirror further transmits the wavelengths longer than the visible spectrum constituting radiant heat energy thereby substantially inhibiting the accumulation of heat within the enclosure; and a baffle assembly borne by the enclosure and which permits light emitted by the lighting means to escape rearwardly of the apparatus and travel along a transmission path, and which further substantially inhibits the light emitted by the lamp from travelling along the line of sight and into the view of the operator, and wherein the lamp is energized by the operator stepping on the brake pedal, and wherein the light transmitted by the semi-transparent mirror may be viewed from a position rearwardly of the apparatus by viewing along the line of sight thereby providing an apparatus which operates as a combination rear view mirror and brake lamp.

2. An apparatus as claimed in claim 1 and wherein the overland vehicle is an automobile having directional signalling assembly, and wherein the lamp is energized by activating the directional signalling assembly, and wherein the apparatus operates as a combination rearview mirror and directional signaling lamp.

3. A visual signalling apparatus for an overland vehicle which has a longitudinal line of reference, an operators position, and a brake pedal, and wherein an operator located in the operator's position has a line of sight, and the apparatus is positioned on the overland vehicle and within the line of sight of the operator, the visual signalling apparatus comprising:

an enclosure having an aperture and defining a cavity, and which is positioned substantially along the longitudinal line of reference;

means for emitting light in predeteremined wavelengths borne by the enclosure and positioned in the cavity, the lighting means including a lamp which emits having wavelengths of 600-700 nanometers, and other wavelengths which constitute radiant heat energy;

a semi-transparent dichroic mirror borne by the enclosure and disposed in occluding relation relative to the aperture, the semi-transparent dichroic mirror adapted to substantially reflect at least an average of 75% of the entire visible light spectrum, and transmit at least an average of 58% of the light having wavelengths of 600–700 nanometers, and transmit light having the wavelengths which constitute radiant heat energy thereby substantially inhibiting the accumulation of heat within the enclosure, and a light control film borne by the enclosure and including a plurality of louvers which permit light emitted by the lamp to escape the enclosure and travel along a transmission path an substantially inhibit light emitted by the lamp from travelling along the line of sight and into the view of the operator, and wherein the lamp is energized by the operator stepping on the brake pedal, thereby causing light to escape rearwardly of the apparatus while simultaneously permitting the operator to view along the line of sight and rearwardly of the overland vehicle, the apparatus operating as a combination rearview mirror and third brake lamp.

4. An apparatus as claimed in claim 3 and wherein the overland vehicle is an automobile having a directional signalling assembly and wherein the lamp is energized by the operator activating the directional signalling assembly, and wherein the apparatus operates as a combination rearview mirror and directional signalling lamp.

5. A visual signalling apparatus mounted on an overland vehicle having a longitudinal line of reference, forward and rearward portions, an operators position, a brake pedal, and directional signalling assembly, and wherein an operator utilizing the apparatus has a line of sight, the apparatus comprising:

an enclosure having a cavity and defining an aperture, the enclosure mounted on the vehicle in a location within the line of sight of the operator who is positioned in the operators position;

a light source mounted on the enclosure and positioned in the cavity, the light source electrically coupled with the brake pedal and the directional signalling assembly such that the light source is energized by the operator actuating the signalling assembly, or the operator stepping on the brake pedal, the light source emitting light waves in a band which is substantially 100 nanometers wide;

a semi-transparent dichroic mirror mounted on the enclosure and disposed in substantially occluding relation relative to the aperture and substantially reflecting at least an average of 75% of the entire visible light spectrum, and transmitting at least 58% of the light having wavelengths which fall within the 100 nanometers wide band; and a light control film having a plurality of louvers permitting the light emitted by the light source to escape the enclosure and travel along a transmission path rearwardly of the apparatus, and wherein the louvers are further operable to substantially block light emitted by the light source from travelling along the line of sight and into the operators view, and wherein the apparatus operates as a combination rear view mirror and directional signalling lamp, or brake lamp.

6. A visual signalling apparatus for use on an overland vehicle which has an operators position, the operator's position disposed in rearwardly offset relation relative to the apparatus, the visual signalling apparatus comprising:

an enclosure having an aperture;

a semi-transparent dichroic mirror borne by the enclosure and substantially occluding the aperture and adapted substantially to reflect light over a broad position of the visible spectrum and to selectively transmit light in a predetermined narrow band which is substantially 100 nanometers wide;

a light source mounted in the enclosure and operable to emit light which is transmitted by the semi-transparent mirror; and a baffle assembly borne by the enclosure and which permits light emitted by the light source to travel along a transmission path so that it may be seen from a position rearwardly of the apparatus but cannot be seen from the operators position while simultaneously permitting light forming an image to be reflected by the dichroic mirror in a fashion where it may be seen from the operators position thereby allowing the area rearwardly of the overland vehicle to be viewed from the operators position.

7. A visual signalling apparatus as claimed in claim 6 and wherein the light source produces light including the wavelengths of 600–700 nanometers and wherein the dichroic mirror transmits the light emitted by the light source having 600–700 nanometers.

8. A visual signalling apparatus as claimed in claim 6 and wherein the baffle assembly includes a light control film having a plurality of louvers which are oriented in a predetermined position to permit the light emitted by the light source to escape the enclosure and travel along the transmission path.

9. A visual signalling apparatus for use by an operator, comprising:

an enclosure having an aperture;

a dichroic mirror borne by the enclosure and adapted selectively to transmit a predetermined narrow band of visible light and simultaneously reflect a broad band of visible light;

a light source borne by the enclosure for emitting light including wavelengths transmitted by the dichroic mirror; and a baffle assembly borne by the enclosure and operable to guide light emitted by the light source along a predetermined transmission path, and wherein the operator by viewing from a position in non-coaxial alignment relative to the transmission path cannot see the light emitted by the light source by may simultaneously employ the apparatus as a mirror to view an area of interest in the vicinity of the transmission path.

10. A visual signalling apparatus as claimed in claim 9 and wherein the narrow band of visible light is not greater than 150 nanometers in width.

11. A visual signalling apparatus as claimed in claim 9 and wherein the light source produces light including wavelengths of 600 through 700 nanometers; and wherein the baffle assembly includes a light control film having a plurality of louvers which are oriented in a predetermined position to permit the light emitted by the light source to escape the enclosure and travel along the transmission path.

12. A visual signalling apparatus as claimed in claim 9 and wherein the dichroic mirror reflects at least an average of 75% of the entire visible light spectrum and substantially transmits at least an average of 58% of the visible light which is transmitted by the dichroic mirror.

13. A visual signalling apparatus as claimed in claim 9 and wherein the baffle assembly is disposed between the dichroic mirror and the light source.

14. A visual signalling apparatus as claimed in claim 9 and wherein the baffle assembly is made integral with the dichroic mirror.

* * * * *

UNITED STATES PATENT AND TRADEMARK OFFICE
CERTIFICATE OF CORRECTION

PATENT NO.   : 5,014,167
DATED        : May 7, 1991
INVENTOR(S)  : John K. Roberts It is certified that error appears in the above-identified patent and that said Letters Patent is hereby corrected as shown below:

| | | |
|---|---|---|
| Column 4, Line 59, | cancel "operator;s" and insert --- operator's ---; |
| Column 7, Line 27, | after "most" delete "clearl" and insert --- clearly by ---; |
| Column 7, Line 68, | cancel "which" and insert --- width ---; |
| Column 9, Line 15, | cancel "operator,s" and insert --- operator's ---; |
| Column 10, Line 46, | after "apparatus" insert --- and the operator may view rearwardly of the overland vehicle ---; |
| Column 10, Line 66, | after "emits" insert --- light ---; |
| Column 11, Line 15, | after "path" cancel "an" and insert --- and ---; |

UNITED STATES PATENT AND TRADEMARK OFFICE
CERTIFICATE OF CORRECTION

PATENT NO. : 5,014,167
DATED     : May 7, 1991
INVENTOR(S) : John K. Roberty

It is certified that error appears in the above-identified patent and that said Letters Patent is hereby corrected as shown below:

```
Column 12, Line 51, after  "source" cancel "by" and insert
-- but --.
```

Signed and Sealed this

First Day of September, 1992

*Attest:*

DOUGLAS B. COMER

*Attesting Officer*  *Acting Commissioner of Patents and Trademarks*